United States Patent [19]

Noda et al.

[11] Patent Number: 4,677,486
[45] Date of Patent: Jun. 30, 1987

[54] VIDEO SIGNAL PROCESSING CIRCUITRY

[75] Inventors: Masaru Noda, Ninomiya; Minoru Kato, Yokohama, both of Japan

[73] Assignee: Hitachi, Ltd., Tokyo, Japan

[21] Appl. No.: 798,819

[22] Filed: Nov. 18, 1985

[30] Foreign Application Priority Data

Nov. 19, 1984 [JP] Japan .................. 59-242310

[51] Int. Cl.$^4$ ............................................. H04N 5/21
[52] U.S. Cl. .................................. 358/166; 358/167; 358/36; 358/37
[58] Field of Search ............... 358/167, 166, 160, 31, 358/36, 37

[56] References Cited

U.S. PATENT DOCUMENTS 4,571,613  2/1986  Fukuda ........................... 358/36
4,575,760  3/1986  Nakagaki et al. ............... 358/167

OTHER PUBLICATIONS

"New Systems for Video Processing ICs": Yamashita et al.; IEEE Transactions of Consumer Electronics, vol. CE-29, #3, pp. 179-194.

Primary Examiner—James J. Groody
Assistant Examiner—Victor R. Kostak
Attorney, Agent, or Firm—Antonelli, Terry & Wands

[57] ABSTRACT

A video signal processing circuitry having a comb filter to extract a vertical contour component of an input video signal by feeding back a signal, which is obtained by subtracting a nondelay signal from a one-line delay signal relative to the iput video signal, with a feedback coefficient K to an input signal of a one-line delay circuit or to both of such input signal and the nondelay signal anterior to the subtraction. The output signal of the comb filter is added with an addition coefficient A to the input video signal introduced to the comb filter or to the input signal of the one-line delay circuit, whereby an output video signal is produced while any noise component is effectively suppressed without deteriorating the distinction of the vertical contour portion. The addition coefficient A is so set as to have, with respect to the feedback coefficient K, a linear functional relationship of $A=\frac{1}{2}+K/2$, $A=\frac{1}{2}-K/2$ or $A=K+\frac{1}{2}$.

10 Claims, 10 Drawing Figures

VIDEO SIGNAL PROCESSING CIRCUITRY

BACKGROUND OF THE INVENTION

The present invention relates to a video signal processing circuitry and, more particularly, to circuitry adapted to improve a video signal-to-noise (SN) ratio by utilizing the vertical correlation in a picture.

In the known means for improving a video signal-to-noise ratio, there is a comb filter of the type that utilizes the vertical correlation in a picture. The vertical correlation is defined here as a characteristic that any one-line component of a video signal obtained by scanning an image in a standard television system resembles the next one-line component. Meanwhile, noise components included in the video signal have no positive correlation between lines unlike the above-mentioned video components and are mutually uncorrelated in general. The principle of a comb filter resides in utilizing the interline correlation of video signal components and the noncorrelation of noise components. In its simplest constitution, there is employed a delay line whose delay time corresponds to one horizontal scanning repetition period, and input and output video signals thereof are added to each other. The absolute value $|G|$ of the gain in the transfer characteristic of such comb filter is given by $$|G| = |\cos(\pi f / fH)| \quad (1)$$

where fH is a horizontal scanning frequency. The term "comb filter" is derived from its characteristic that a peak point and a dip point obtained when $f = nfH$ ($n = 0, 1, 2, \ldots$) and $f = (n + \frac{1}{2})fH$ respectively are equispaced like the teeth of a comb. As known well, the frequency spectrum of a video signal having a close interline correlation concentrates on frequencies near nfH, so that the comb filter of the above-mentioned characteristic causes little loss to the video signal while suppressing merely the noise components existent near $(n + \frac{1}{2})fH$ to consequently improve the SN ratio.

In the prior art developed for reducing the response at frequencies near $(n + \frac{1}{2})fH$ in a wider range to further enhance the effect of improving the SN ratio, one example is disclosed in "NEW SYSTEMS FOR VIDEO PROCESSING ICs" by Noriyuki Yamashita et al. IEEE transactions on Consumer Electronics, pp. 179–194, vol. CE-29, No. 3, August 1983. The circuitry described therein includes a feedback circuit with a variable attenuator to render the comb characteristic by selectively setting a feedback coefficient K. However, one of the technical difficulties existing in such circuitry is concerned with a phenomenon that the gain at a frequency fnH varies in accordance with change of the coefficient K to eventually cause a variation in the signal output level. And no adequate contrivance has been proposed heretofore to eliminate blur induced in the vertical contour of a picture concomitant with the use of such a comb filter.

SUMMARY OF THE INVENTION

It is an object of the present invention to provide a video signal processing circuit of a novel configuration with a comb filter of improved characteristics accomplished by solving the problems observed in the conventional comb filter.

In order to achieve the object described above, the present invention comprises means for subtracting a nondelay signal from a one-line delay signal to obtain a subtraction signal and feeding it back with a coefficient K to an input signal of a one-line delay circuit or to both of such input signal and the nondelay signal anterior to the subtraction; and means for adding the said subtraction signal and the input signal to be processed or the input signal of the one-line delay circuit with an addition coefficient A to produce a processed output signal. In this circuit configuration, the addition coefficient A with regard to the signal obtained by subtracting the nondelay signal from the one-line delay signal is set to be in a particular relationship to the feedback coefficient K, so that the gain at a frequency nfH is maintained at a fixed value and a desired comb filter characteristic is attainable with the feedback coefficient K while the response at a frequency $(n + \frac{1}{2})fH$ is kept at zero.

According to the feature of the present invention, the response at a frequency $(n + \frac{1}{2})fH$ can be retained at zero with respect to any feedback coefficient K, whereby remarkable effect is rendered achievable in improving the SN ratio.

The configuration mentioned above is so modifiable as to execute control of the addition coefficient A in accordance with the amplitude of the vertical contour signal, thereby improving the SN ratio successfully without deteriorating the distinction of the vertical contour.

DESCRIPTION OF THE PREFERRED EMBODIMENTS

Figure 1:
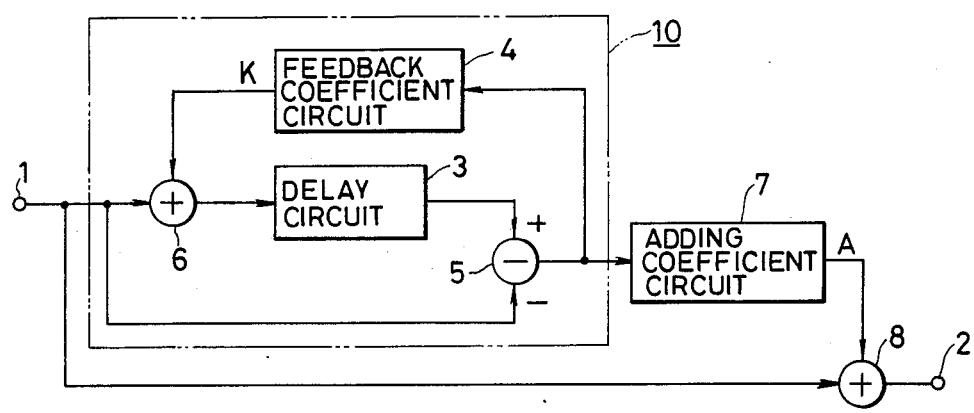
FIG. 1 is a block diagram showing a basic circuit configuration of an exemplary embodiment according to the present invention.

In the circuit block diagram of FIG. 1 showing the principle of a first embodiment of the present invention, a video signal to be processed is inputted to a terminal 1, and the processed video signal is obtained at an output terminal 2. The video signal fed to the input terminal 1 is introduced partially via an adder 6 to a one-line delay circuit 3, and the signal delayed in the circuit 3 is then applied to one input of a subtracter 5. Meanwhile, the video signal fed to the input terminal 1 is also applied partially to another input of the subtracter 5 and is thereby subtracted from the one-line delay signal. The resultant signal obtained by subtraction of the nondelay signal from the one-line delay signal is then fed to both a feedback coefficient circuit 4 for determining a feedback coefficient K and an addition coefficient circuit 7 for determining an addition coefficient A. The feedback signal passed with the coefficient K through the feedback coefficient circuit 4 is added to the input video signal in the adder 6.

The transfer characteristic in the path from the input terminal 1 to the input of the addition coefficient circuit 7 is given by $$G1 = -\frac{1 - \epsilon^{-j\phi}}{1 - K\epsilon^{-j\phi}} \quad (2)$$

where $\phi = 2\pi f/fH$

Figure 2:
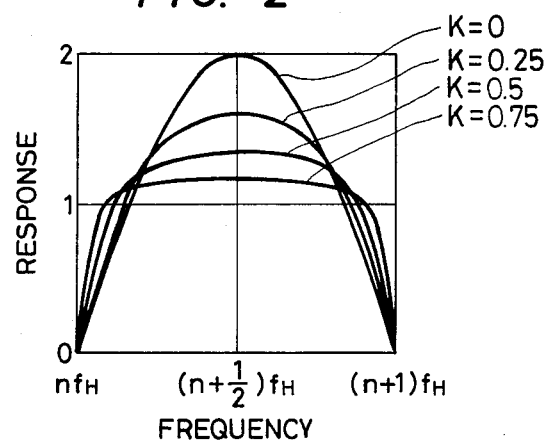
FIGS. 2 and 3 graphically plot the operating characteristic of the circuit shown in FIG. 1.

The absolute value of Eq. (2) is graphically plotted in FIG. 2, according to which the characteristic changes depending on the feedback coefficient K while the response is always zero at an frequency nfH and indicates a peak value at a frequency $(n+\frac{1}{2})$ fH. As mentioned previously, the video signal spectrum of a picture having a close vertical interline correlation (picture with small vertical change) concentrates on frequencies near nfH, while the video signal spectrum of a picture having a remote vertical interline correlation (picture with great vertical change) particularly in its vertical contour concentrates on frequencies near $(n+\frac{1}{2})$ fH and such concentration is more conspicuous as the contour becomes sharper. It follows, therefore, that merely the vertical contour component of the input video signal is selectively extracted due to such characteristic shown in FIG. 2. For the above reason, the circuit portion enclosed with a dotted-line frame in FIG. 1 is termed here a vertical-contour extracting comb filter. This filter 10 is the same in constitution as the chroma-signal extracting comb filter disclosed in the cited reference.

In the embodiment of the present invention, the output signal of the vertical-contour extracting comb filter 10 is fed via the addition coefficient circuit 7 to the adder 8 so as to be added to the input video signal, whereby a desired output video signal is obtained at the output terminal 2.

The addition coefficient circuit 7 for determining an addition coefficient A may be of either a type having linear characteristic or another type having nonlinear characteristic.

Referring first to an exemplary case where the addition coefficient circuit 7 employed is of a linear characteristic type, the transfer characteristic G2 in the path from the input terminal 1 to the output terminal 2 is given by $$G2 = 1 + A \cdot G1 = 1 - A\frac{1 - \epsilon^{-j\phi}}{1 - K\epsilon^{-j\phi}} \quad (3)$$

If the addition coefficient A is so set as to have, with respect to the feedback coefficient K, a particular relationship represented by Eq. (4), then Eq. (3) is modified to Eq. (3').

$$A = \frac{1}{2} + \frac{K}{2} \quad (4)$$

$$G2 = \frac{1 + \epsilon^{-j\phi}}{2} \cdot \frac{1 - K}{1 - K\epsilon^{-j\phi}} \quad (3')$$

Figure 3:
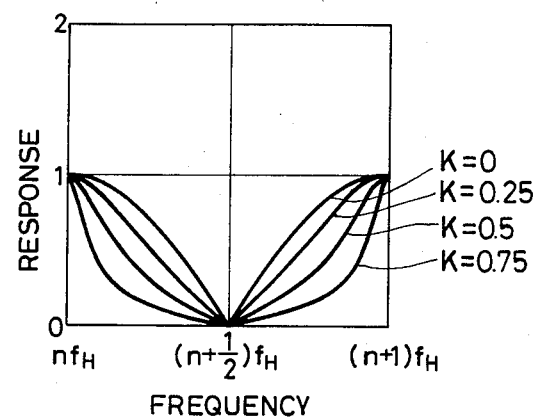

The first term of the product in Eq. (3') denotes the addition average of the one-line delay signal and the nondelay signal, and signifies such comb characteristic that the response is zero when $\phi = 2\pi(n+\frac{1}{2})$, i.e. $f = (n+\frac{1}{2})$ fH. Meanwhile, the second term signifies such comb characteristic that the response becomes minimum when $f = n+\frac{1}{2}$ fH. FIG. 3 graphically shows Eq. (3') with the feedback coefficient K changed, wherein the response when $f = nfH$ is kept at a fixed value of 1.0 regardless of the feedback coefficient K, while the response when $f = (n+\frac{1}{2})$ fH is retained at zero regardless of the coefficient K. And the comb characteristic is alterable in accordance with the value of the feedback coefficient K. For example, if K is selectively set at 0.75 to reduce the response in a wide range centered at a frequency $(n+\frac{1}{2})$ fH, then it becomes possible to attain great improvement in the SN ratio. In case the relationship between the two coefficients A and K fails to satisfy the condition established by Eq. (4), the response at a frequency $(n+\frac{1}{2})$ fH does not become zero so that the effect of improving the SN ratio is diminished.

Figure 4:
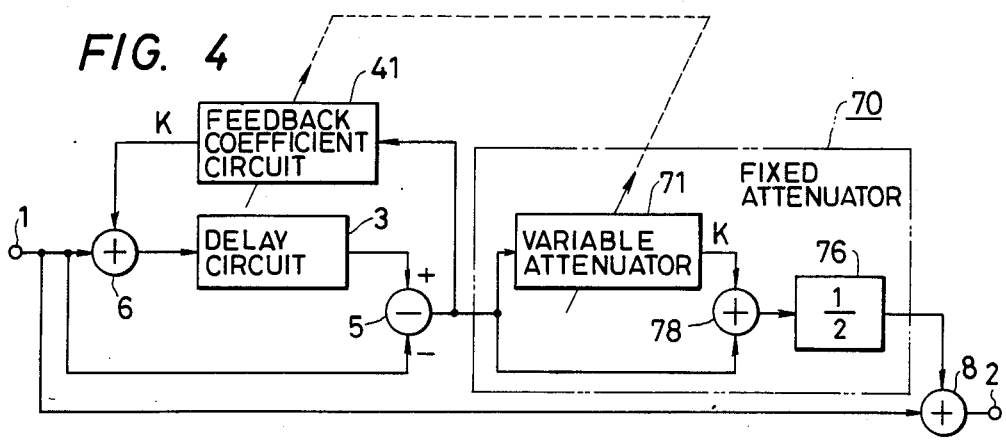
FIG. 4 is a block diagram of another embodiment equipped with an exemplary addition coefficient circuit for setting an addition coefficient of a vertical contour signal.

Thus, the essential point of this embodiment resides in the provision of an addition coefficient circuit 7 which satisfies the condition established by Eq. (4) An example of such addition coefficient circuit is shown in FIG. 4 together with a vertical-contour extracting comb filter, as enclosed with a dotted-line frame 70. This example employs a variable attenuator 71 of the same type as the feedback coefficient circuit 41, and the two attenuation coefficients K thereof are changed under ganged control. Such ganged setting of the attenuation coefficients K is executed similarly in the following embodiments as well. Each of the variable attenuators 41 and 71 may be composed of an ordinary well-known circuit. The output of the variable attenuator 71 is added to its input signal in an adder 78 and then is fed to a fixed attenuator 76 which reduces the amplitude of the input signal to a half.

Figure 5:
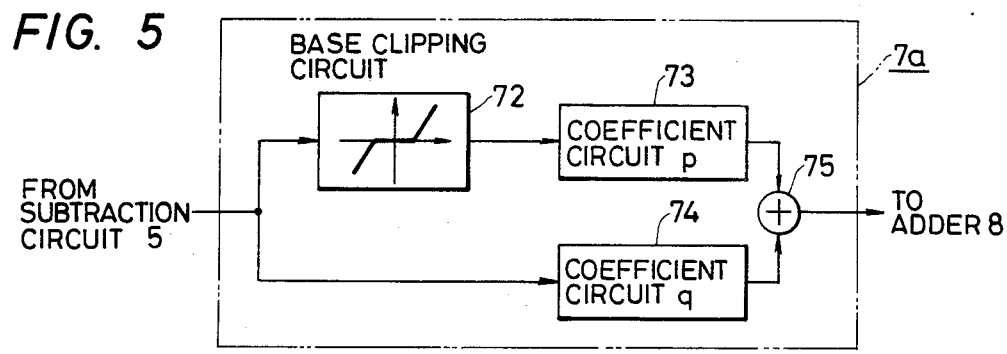
FIG. 5 is a block diagram of an exemplary addition coefficient circuit having nonlinear characteristic.
Figure 6:
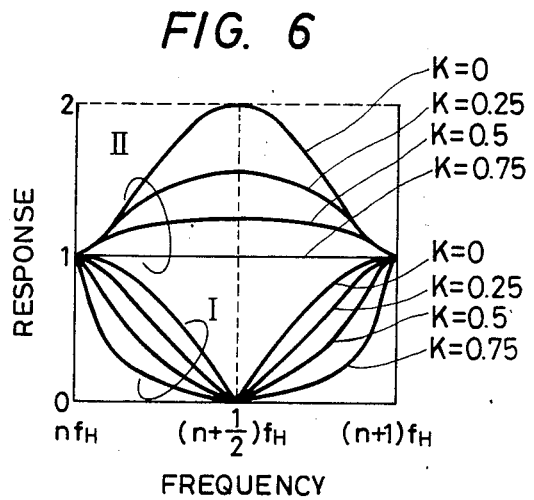
FIG. 6 graphically plots the operating characteristic of the circuit shown in FIG. 5.

A description will now be given on a second embodiment where the addition coefficient circuit 7 has nonlinear characteristic. An exemplary circuit of nonlinear characteristic employed in this embodiment is shown in FIG. 5, wherein designated at 72 is a base clipping circuit for generating such nonlinear characteristic. This circuit 72 functions to check passage of the input signal of a small amplitude while permitting passage of the input signal of a greater amplitude exceeding a predetermined clipping level. Since the input to the addition coefficient circuit 7a includes a vertical contour signal component and a noise component as mentioned previously, the clipping level is set to be slightly greater than the amplitude of the noise component. Then the base clipping circuit 72 checks passage of the video signal of any flat picture portion where no vertical contour component is existent in the image, so that the substantial addition coefficient of the circuit 7a is determined by the coefficient q of a circuit designated at 74. When the coefficient q is so set as to satisfy the condition of Eq. (4) by a circuit similar to the aforesaid addition coefficient circuit 70 of FIG. 4, then the same characteristic as in the first embodiment is obtained to achieve remarkable effect of improving the SN ratio. In the vertical contour of a picture, the input to the addition coefficient circuit 7a is the sum of the vertical contour signal and the noise component, so that the input amplitude comes to exceed the clipping level and therefore the signal is permitted to pass through the base clipping circuit. Consequently, the substantial addition coefficient of the circuit 7a becomes p+q. If the value of p is set within a range of $P + q \leq 0$, the characteristic attained becomes flat or peaks at a frequency $(n+\frac{1}{2})$ fH as represented by a group of curves II in FIG. 6, so that a distinct picture is obtainable where the vertical contour is free from blur or is intensified. Thus, in addition to the feature of the foregoing first embodiment, the circuit action is selectively changed in the second embodiment in accordance with the presence or absence of a vertical contour or the intensity thereof, whereby the SN ratio is improved with elimination of blur in the contour portion.

The addition coefficient circuit 7a having a nonlinear characteristic shown in FIG. 5 is operated such that as described above, the addition coefficient may be varied in response to one case where an amplitude of the input signal is larger than a clipping level of the base clipping circuit 72 and another case where the amplitude is lower than the clipping level, respectively. Therefore, since the addition coefficient is changed over in response to the level of the input signal, it is possible to say that the addition coefficient circuit 7a has a selective switching function in which the addition coefficient is changed over.

Figure 7:
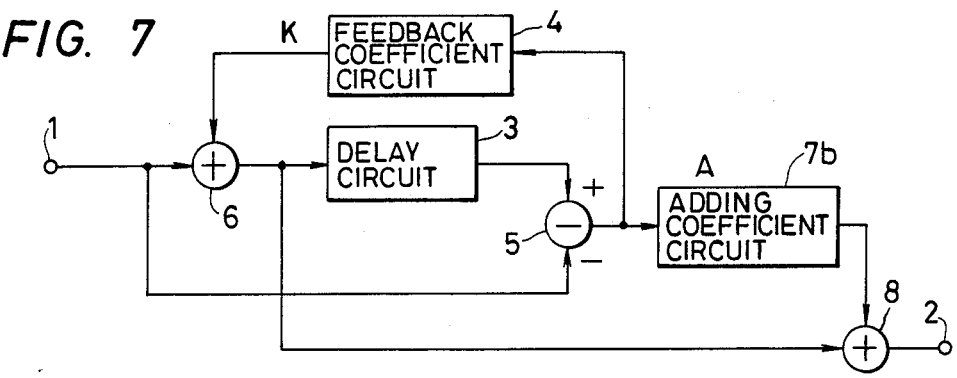
FIGS. 7 and 9 are block diagrams of further embodiments according to the present invention.

Now a third embodiment of the present invention will be described with reference to FIG. 7, in which the same reference numerals as those used previously for the first embodiment denote the same or equivalent components. The difference from the foregoing example of FIG. 1 resides in that one of the signals fed to the output adder 8, i.e. the input signal introduced to the input terminal 1 so as to be processed, is replaced with the signal fed to the one-line delay circuit 3. The transfer characteristic G3 in the path from the input terminal 1 to the input of the one-line delay circuit 3 is expressed as Eq. (5), so that the overall transfer characteristic G2 in the entire circuitry is given by Eq. (6).

$$G3 = 1 - K \frac{1 - \epsilon^{-j\phi}}{1 - K\epsilon^{-j\phi}} \tag{5}$$

$$G2 = G3 + A \cdot G1 = 1 - (K + A) \frac{1 - \epsilon^{-j\phi}}{1 - K\epsilon^{-j\phi}} \tag{6}$$

If the addition coefficient A of the addition coefficient circuit 7b is so set as to have, with respect to the feedback coefficient K, a particular relationship represented by Eq. (7), then Eq. (6) is modified to Eq. (3') which is the same as in the foregoing first embodiment.

$$A = \frac{1}{2} - \frac{K}{2} \tag{7}$$

Thus, the same characteristic as that of the first embodiment is obtainable merely by changing the relationship between the coefficients A and K. Accordingly, the equivalent effect is achievable with respect to improvement in the SN ratio as well.

Figure 8:
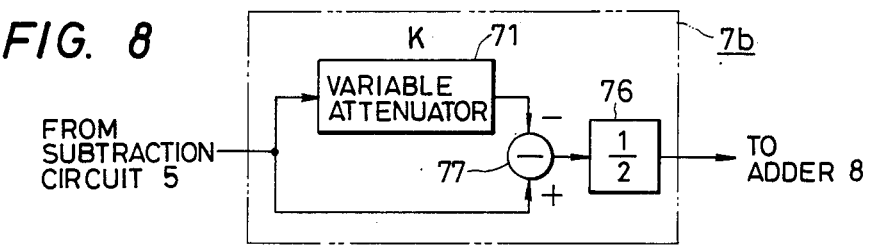
FIGS. 8 and 10 are block diagrams of exemplary addition coefficient circuits employed in the embodiments of FIGS. 7 and 9 respectively.

FIG. 8 shows an exemplary addition coefficient circuit 7b which is capable of satisfying the condition of Eq. (7). In this constitution, the adder 78 in the addition coefficient circuit 70 of FIG. 4 is replaced with a subtracter 77 so as to subtract the output of the variable attenuator 71 from its input signal.

In a modified arrangement (not shown), the addition coefficient circuit 7b is altered to a type of nonlinear characteristic as in the aforementioned second embodiment, and a path including the base clipping circuit 72 and the coefficient circuit 73 of FIG. 5 is additionally connected to the circuit of FIG. 8. Then a desired circuit action is performed in accordance with the presence or absence of a vertical contour.

Figure 9:
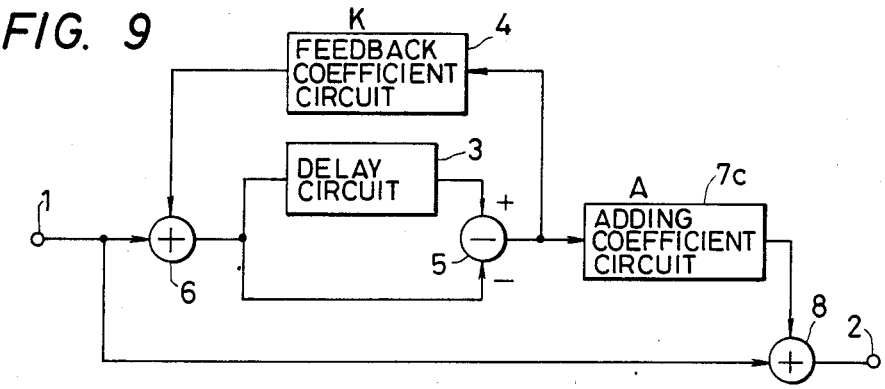

FIG. 9 shows a fourth embodiment of the present invention, wherein reference numerals are given in the same manner as in the foregoing embodiments. In comparison with the aforesaid embodiments, this exemplary configuration is different in the stage posterior to feedback of the difference signal which is obtained between the input and output signals of the one-line delay circuit. That is, such difference signal is fed back to the path of the nondelay signal applied to the subtracter 5, as well as to the input of the one-line delay circuit. In FIG. 9, the transfer characteristic in the path from the input terminal to the input of the addition coefficient circuit 7c is given by $$G1 = -\frac{1}{1 + K} \cdot \frac{1 - \epsilon^{-j\phi}}{1 - \frac{K}{1 + K} \epsilon^{-j\phi}} \tag{8}$$

Supposing here $$k = \frac{K}{1 + K} \tag{9}$$

Eq. (8) is modified to Eq. (8') as follows.

$$G1 = -(1 - k)\frac{1 - \epsilon^{-j\phi}}{1 - k\epsilon^{-j\phi}} \tag{8'}$$

As contrasted with Eq. (2), it is manifest that the above is equivalent to $(1-k)$ times the value of Eq. (2) (with k being settable at any desired value). That is, the input to the addition coefficient circuit 7c is merely the vertical contour signal alone as in the foregoing embodiments. The overall transfer characteristic in the entire circuitry from the input terminal 1 to the output terminal 2 is given by $$G2 = 1 - A(1 - k)\frac{1 - \epsilon^{-j\phi}}{1 - k\epsilon^{-j\phi}} \tag{10}$$

If the coefficient A is so set as to have, with respect to the coefficient K, a particular relationship represented by Eq. (11), Eq. (10') is obtained by rewriting Eq. (10).

$$A = K + \frac{1}{2} \tag{11}$$

$$G2 = \frac{1 + \epsilon^{-j\phi}}{2} \cdot \frac{1 - k}{1 - k\epsilon^{-j\phi}} \tag{10'}$$

where $$k = \frac{1}{1 + K}$$

In Eq. (10'), as contrasted with Eq. (3'), the mere change is that K is replaced with k. Since k is settable at any desired value, it is obvious that the fourth embodiment ensures satisfactory characteristic and effect of improving the SN ratio similar to those of the first embodiment.

Figure 10:
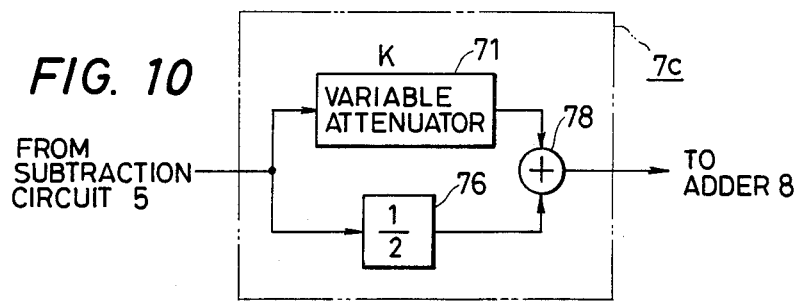

FIG. 10 shows another exemplary addition coefficient circuit 7c which is capable of satisfying the condition of Eq. (11). In this circuit configuration, the output of a vertical-contour extracting comb filter is fed to both a variable attenuator 71 and a fixed halving attenuator 76, whose respective outputs are then added to each other.

We claim:

1. A video signal processing circuit capable of improving a signal-to-noise ratio without deteriorating the sharpness of a vertical contour of a video signal, said circuit comprising: comb filter means having a delay circuit whose delay time corresponds to one line period of an input video signal, a subtraction circuit for subtracting the input video signal from the output signal of said delay circuit, and feedback means for feeding back the output signal of said subtraction circuit with a feedback coefficient K to the input signal of said delay circuit, said filter means functioning to extract the vertical contour component from the input video signal; and adding means for adding the output signal of said subtraction circuit with an addition coefficient A to the input video signal; wherein said addition coefficient A is so set as to have, with respect to said feedback coefficient K, a particular relationship represented by a linear function so that the response is dipped at a frequency $(n+\frac{1}{2})fH$, in which n is an integer, and fH is a horizontal scanning repetition frequency.

2. The video signal processing circuit as defined in claim 1, wherein said feedback means feeds back the output signal of said subtraction circuit to the input signal of said delay circuit, and said adding means produces its output by adding the output signal of said subtraction circuit to the input video signal while the relationship between said addition coefficient A and feedback coefficient K is maintained as $A=\frac{1}{2}+K/2$.

3. The video signal processing circuit as defined in claim 2, wherein said adding means comprises first attenuation means fed with the output signal of said subtraction circuit and having an attenuation factor established to be equivalent to the feedback coefficient of said feedback means, addition means for adding the input and output signals of said first attenuation means, and second attenuation means for attenuating the output signal of said addition means to a half amplitude.

4. The video signal processing circuit as defined in claim 1, wherein said feedback means feeds back the output signal of said subtraction circuit to the input signal of said delay circuit, and said adding means produces its output by adding the output signal of said subtraction circuit to the input signal of said delay circuit while the relationship between said addition coefficient A and feedback coefficient K is maintained as $A=\frac{1}{2}-K/2$.

5. The video signal processing circuit as defined in claim 4, wherein said addition output means comprises first attenuation means fed with the output signal of said subtraction circuit and having an attenuation factor established to be equivalent to the feedback coefficient of said feedback means, subtraction means for subtracting the output signal of said first attenuation means from the input signal thereof, and second attenuation means for attenuating the output signal of said subtraction means to a half amplitude.

6. The video signal processing circuit as defined in claim 1, wherein said subtraction circuit subtracts the input signal of said delay circuit from the output signal thereof, said feedback means feeds back the output signal of said subtraction circuit to the input video signal of said delay circuit, and said adding means produces its output by adding the output signal of said subtraction circuit to the input video signal while the relationship between said addition coefficient A and feedback coefficient K is maintained as $A=K+\frac{1}{2}$.

7. The video signal processing circuit as defined in claim 6, wherein said adding means comprises first attenuation means fed with the output signal of said subtraction circuit and having an attenuation factor established to be equivalent to the feedback coefficient K of said feedback means, third attenuation means fed with the output signal of said subtraction circuit and functioning to attenuate the received signal to a half amplitude, and means for adding the respective output signals of said first and third attenuation means to each other.

8. The video signal processing circuit as defined in claim 2, wherein the relationship between said addition coefficient A and feedback coefficient K is maintained as $A=\frac{1}{2}+K/2$ when the amplitude of the signal inputted from said subtraction circuit is below a predetermined threshold level, and said adding means further includes selective switching means for changing said addition coefficient A from said relationship when said amplitude is in excess of said predetermined threshold level.

9. The video signal processing circuit as defined in claim 4, wherein the relationship between said addition coefficient A and feedback coefficient K is maintained as $A=\frac{1}{2}-K/2$ when the amplitude of the signal inputted from said subtraction circuit is below a predetermined threshold level, and said adding means further includes selective switching means for changing said addition coefficient A from said relationship when said amplitude is in excess of said predetermined threshold level.

10. The video signal processing circuit as defined in claim 6, wherein the relationship between said addition coefficient A and feedback coefficient K is maintained as $A=K+\frac{1}{2}$ when the amplitude of the signal inputted from said subtraction circuit is below a predetermined threshold level, and said adding means further includes selective switching means for changing said addition coefficient A from said relationship when said amplitude is in excess of said predetermined threshold level.

* * * * *